(12) United States Patent
Kalore

(10) Patent No.: US 8,356,761 B2
(45) Date of Patent: Jan. 22, 2013

(54) COMMUNICATION POWERED BUILDING AUTOMATION SYSTEM ACTUATOR

(75) Inventor: Pankaj V. Kalore, Buffalo Grove, IL (US)

(73) Assignee: Siemens Industry, Inc., Alpharetta, GA (US)

(*) Notice: Subject to any disclaimer, the term of this patent is extended or adjusted under 35 U.S.C. 154(b) by 757 days.

(21) Appl. No.: 12/533,509

(22) Filed: Jul. 31, 2009

(65) Prior Publication Data

US 2010/0140365 A1    Jun. 10, 2010

Related U.S. Application Data

(60) Provisional application No. 61/137,484, filed on Jul. 31, 2008.

(51) Int. Cl.
    *G05D 23/00*      (2006.01)
    *G08B 1/00*      (2006.01)
    *G08B 1/08*      (2006.01)
    *G08B 13/12*      (2006.01)

(52) U.S. Cl. ........ 236/51; 340/531; 340/538; 340/568.2

(58) Field of Classification Search .................... 236/51; 29/729; 323/265, 267, 282; 340/501, 531, 340/538, 568.2
See application file for complete search history.

(56) References Cited

U.S. PATENT DOCUMENTS

| | | | |
|---|---|---|---|
| 7,187,158 B2 * | 3/2007 | Huisenga et al. | 323/282 |
| 2004/0066245 A1 | 4/2004 | Crenella et al. | |
| 2007/0131784 A1 | 6/2007 | Garozzo et al. | |

FOREIGN PATENT DOCUMENTS

| | | |
|---|---|---|
| EP | 0 695 918 A | 2/1996 |
| EP | 0 864 819 A | 9/1998 |
| WO | WO 02069576 A1 * | 9/2002 |

OTHER PUBLICATIONS

PCT Search Report dated Dec. 11, 2009.

* cited by examiner

*Primary Examiner* — Chen Wen Jiang

(57) ABSTRACT

An actuator includes at least one drive arrangement configured to generate output mechanical power from input electrical power. The actuator also includes a communication line input port and a control unit. The communication line input port is configured to connect to a communication line, and is configured to obtain electrical power from the communication line. The control unit is configured to obtain first information from the communication line via the communication line input port, and is further configured to adjust the operation of the at least one drive arrangement based on the first information and based upon information identifying electrical power available for use as input electrical power.

10 Claims, 5 Drawing Sheets

COMMUNICATION POWERED BUILDING AUTOMATION SYSTEM ACTUATOR

This application claims the benefit of U.S. Provisional Application Ser. No. 61/137,484, filed Jul. 31, 2008, which is incorporated herein by reference.

FIELD OF THE INVENTION

The present invention relates to actuators, and more specifically, actuators for use in building control systems.

BACKGROUND OF THE INVENTION

Actuators are integral devices in building automation systems, including heating, ventilation and air conditioning (HVAC) systems. Actuators can be used to rotate chilled water or steam valves, and to open and close ventilation dampers. Dampers can be used for general comfort control as well as for laboratory safety ventilation.

In particular, with regard to dampers, ventilation dampers of HVAC systems control the flow of air into a room, space, air handling unit or ventilation duct or shaft. The dampers may be completely open, closed, or at varying degrees of partially open. Further opening a damper has the effect of increasing the flow of air through the damper, while further closing a damper has the effect of decreasing the flow of air through the damper. When the air flow consists of chilled air, or heated air, then the opening and closing of dampers may be used to regulate the temperature in a space.

Some ventilation dampers are manually actuated. However, building automation systems typically include automatically operated ventilation dampers, and typically large numbers of such dampers. The position of the damper (i.e. its degree of "openness") in such a system is usually under the control of an automated controller. The controller adjusts the position of the damper based on whether more or less air flow to the room is desired.

A damper actuator is the electromechanical (or other) device that converts the control signals from the controller to the motive force that physically adjusts the position of the damper. The actuator may include a motor and gear set. In some cases, an actuator is in the form of a solenoid, or motor in combination with a mechanical bias spring. Various forms of actuators are available and suitable for use.

In addition to ventilation dampers, actuators are also used to control the operations of valves in HVAC systems. A valve actuator is similar to a damper actuator in that it converts control signals into a motive force the physically adjusts the position of the valve, thereby admitting a controlled flow of chilled water, steam or other liquid through an orifice.

One issue arising from the use of dampers and valves is the cost and time required for installation. Because dampers and valves are typically outside an occupied space, such as in the plenum (i.e. above the ceiling) of rooms and hallways, installation is at best inconvenient. Moreover, because actuators must be able to receive control signals and employ electrical power, each actuator requires cabling and coupling to new or existing communication and/or power circuits.

There is a need to reduce costs associated with installing actuators in an HVAC system.

SUMMARY

At least some embodiments of the present invention address the above described issues by providing a communication line powered actuator. In particular, electrical power for operating the actuator is provided to the actuator assembly via communication lines. The power may in some cases be stored in one or more energy storage devices and used when movement of the actuator is necessary. Alternatively, the actuator may be designed to accommodate the available power levels provided via the communication lines.

A first embodiment of the invention is an actuator that includes at least one drive arrangement configured to generate output mechanical power from input electrical power. The actuator also includes a communication line input port and a control unit. The communication line input port is configured to connect to a communication line, and is configured to obtain electrical power from the communication line;

The control unit is configured to obtain first information from the communication line via the communication line input port, and is further configured to adjust the operation of the at least one drive arrangement based on the first information and based upon information identifying electrical power available for use as input electrical power.

Other embodiments involve communications to allow multiple devices connected to the same communication power source to share in the available power.

These embodiments allow for convenient wiring of actuators in a manner that does not require a separate power cord.

The above described features and advantages, as well as others, will become more readily apparent to those of ordinary skill in the art by reference to the following detailed description and accompanying drawings.

DETAILED DESCRIPTION

Figure 1:
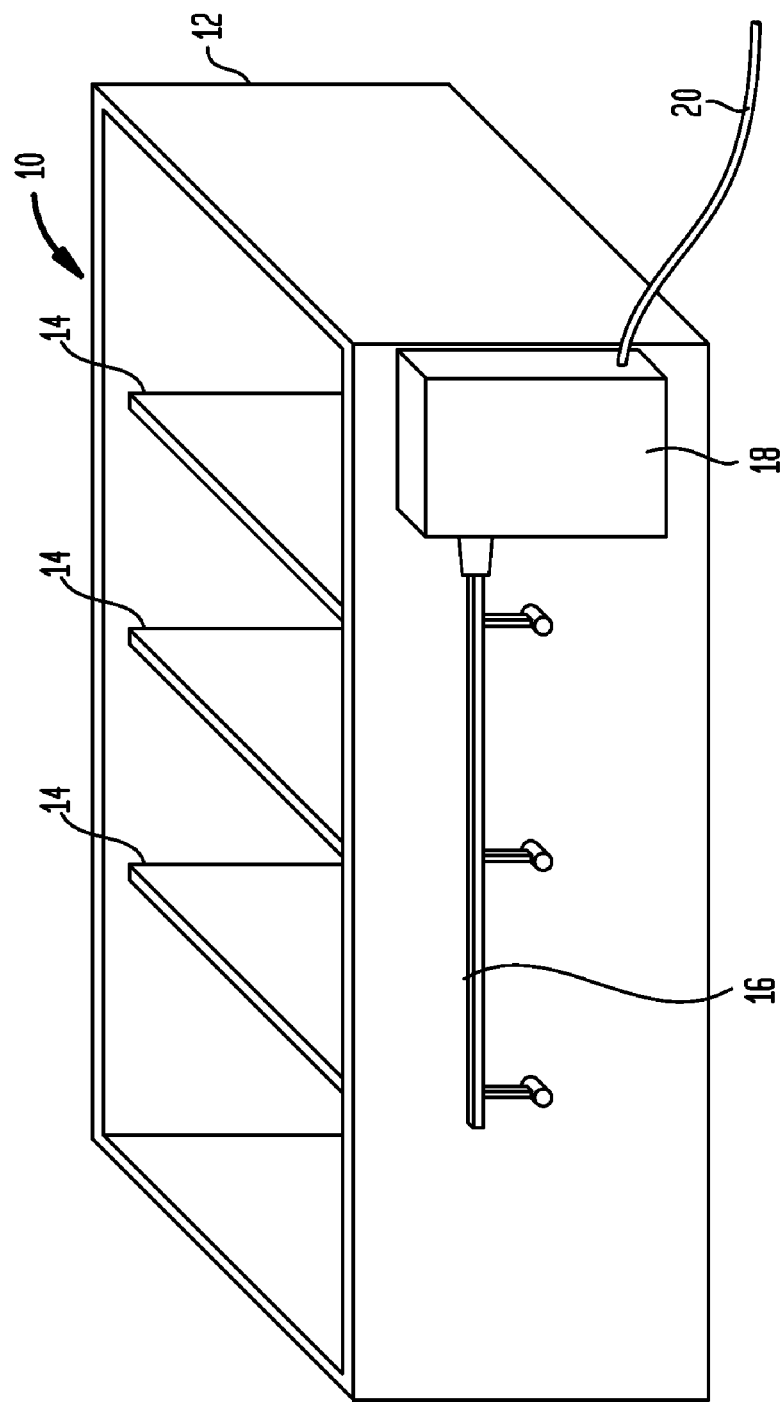
FIG. 1 shows an exemplary damper assembly according to an embodiment of the invention.
Figure 2:
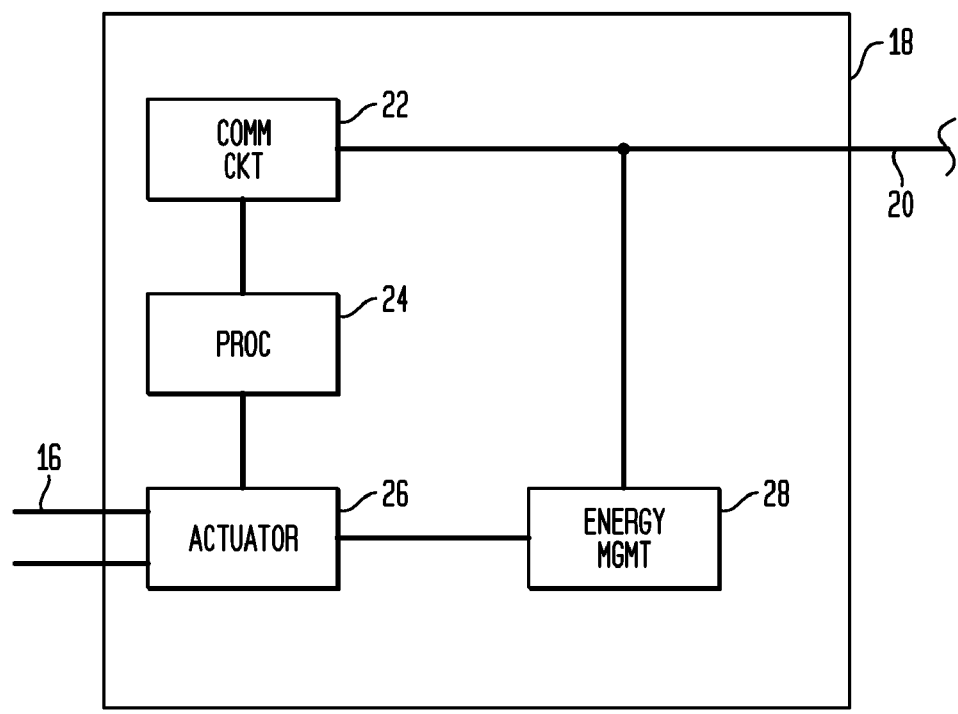
FIG. 2 shows a schematic diagram of the damper actuator of FIG. 1.

FIGS. 1 and 2 show an exemplary embodiment of the present invention implemented in a ventilation damper. FIG. 1 shows a ventilation damper arrangement 10 that includes a housing or frame 12, a plurality of movable dampers 14, linkage 16, and an actuator module 18. These elements may take any suitable configuration, except that the actuator module 18 includes an arrangement configured to obtain electrical power from a communication line 20 to power the actuator.

FIG. 2 shows an exemplary embodiment of the actuator module 18. It will be appreciated that the elements of actuator module 18 as described herein do not necessarily have to be a part of a physical "module", but rather may be separately housed components that are mounted on (directly or indirectly) the frame 12 of the damper arrangement 10.

The actuator module 18 includes a communication circuit 22, a processor 24, an actuator 26, and an energy management unit 28. The communication circuit 22 may be any suitable circuit that can receive command signals from a separately-located controller device via the communication line 20. In the embodiment described herein, the communication circuit 22 receives digital signals via the communication line 20. The communication circuit 22 obtains the digital signals and provides a digital signal to the processing circuit 24 representative of a command regarding changing the position (degree of openness) of the dampers 14 of the ventilation damper arrangement 10.

The processing circuit 24 is a device that receives digital commands from the communication circuit 22, and generates actuator signals therefrom. The actuator signals are employed by the actuator 26 to controllably move the linkage 16 in one direction or another. Various suitable actuators, as well as corresponding communication and processing circuits, are well known in the art.

The communication line 20 may suitably be any of IP/Ethernet/RS-485/RS-222/RS-232/Optic Fiber/Power Line. In accordance with the present invention, the actuator 26 receives operating power from the energy management unit 28. To this end, the energy management unit 28 preferably includes one or more energy storage devices such as batteries, large capacitors, and/or similar components, and preferably also includes a power converter or power supply. The energy management unit 28 is further coupled to the communication line 20 to obtain energy therefrom.

The energy management unit 28 stores energy obtained from the communication line 20 in the energy storage device(s). It is noted that in some cases, the instantaneous power received from the communication line 20 may be typically insufficient to power the actuator 26. However, because the actuator 26 is moved only periodically (i.e. non-continuously), the energy management unit 28 can accumulate energy from the communication line 20 in the energy storage devices. The energy storage devices can then, on a periodic basis, provide power to the actuator 26 in excess of what is available from the communication line 20. It will be appreciated, however, that at least some of the power provided to the actuator may be derived from the communication line 20.

In one alternative, the processor circuit 24 is configured to change the operation of the actuator based on the available power on the communication line 20. In particular, due to the loading of other devices connected to the communication line 20, not shown in FIG. 1, the available power provided via the communication can vary. In some embodiments, the processor 24 is configured to adjust the speed of the actuator, or some other operation, such that the power requirements of the actuator 26 can be met by the power available on the communication line 20.

Figure 3:
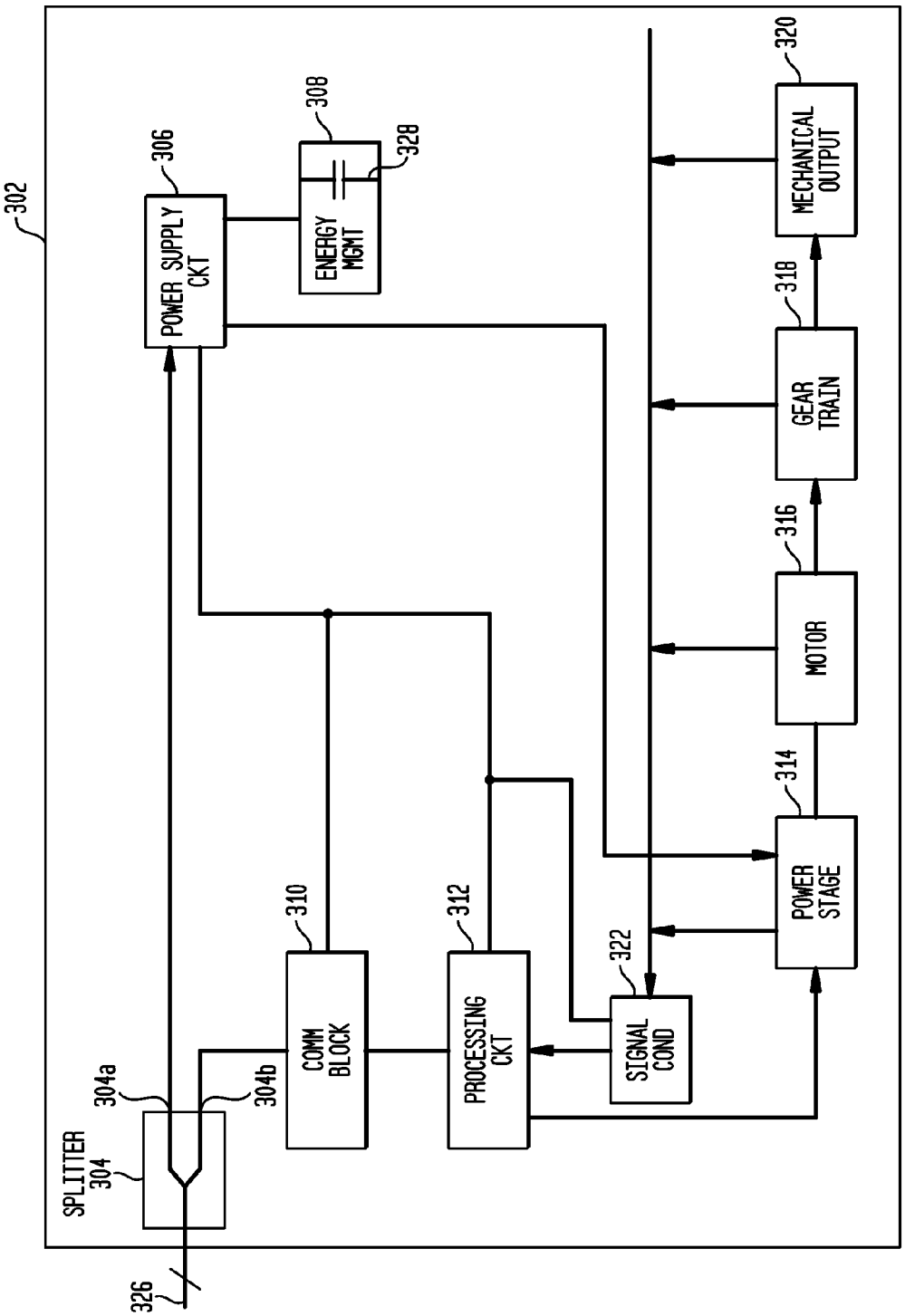
FIG. 3 shows in further detail a schematic diagram an exemplary actuator according to at least some embodiments of the invention.

FIG. 3 shows in further detail an actuator arrangement 300 according to an embodiment of the invention. The actuator arrangement 300 includes a housing 302 in which are disposed a splitter 304, a power supply circuit 306, an energy management circuit 308, a communication circuit 310, a processing circuit 312, a power stage 314, a motor 316, a gear train 318, a mechanical output 320 and a signal conditioning circuit 322.

The housing 302 in this embodiment includes an Ethernet 8 pin jack/port 324, sometimes referred to as 8P8C or RJ45 connector. As will be discussed below, some configurations may employ a second port of identical design connected to the port 324, to allow for parallel connection of another device in the manner illustrated in FIG. 4.

The jack or port 324 is configured to connected to a communication line 326. The communication line 326 may suitably be an Ethernet cable that supports Power Over Ethernet (PoE) functionality. A common Ethernet cable configuration includes eight conductors. In one configuration, four of the conductors are used for communication signals, and four of the conductors are used to carry power. The amount of power provided on the communication lines 326 may be in the range of 13 W, or even as high as 52 W, depending on the source of the power connected to the communication lines.

By way of example, the IEEE 802.3af standard defines the PoE power level at 13 W, while the IEEE 802.3at standard limits the PoE power level at 30 W. The communication line 326 may suitably be connected to a source of such power. In addition, a model POE60U-56OG 60 W midspan device can deliver 52 W of low voltage power, and is available from Phihong USA, of Fremont Calif. The communication line 326 may be connected to such a device. Further detail regarding the connection of actuators to a communication line capable of providing PoE is set forth below in connection with FIG. 4.

Referring again generally to the actuator 300, the housing 302 is any suitable enclosure or partial enclosure that supports the elements listed above. The splitter 304 is operably connected to the jack 324 and is configured to split the communication signals from the electrical power signals received over the communication line 326. The splitter 304 has a first output 304a operably connected to provide the power signal to the power supply 306, and a second output 304b operably connected to provide the communication signal to the communication circuit 312. In this case, the splitter 304 merely physically connects the corresponding data and power pins of the jack/port 324 to the appropriate outputs 304a, 304b.

The power supply circuit 306 is one or more groups of circuit elements that are configured to convert power signals received from the communication line 326 via the jack 324 and the splitter 304, and convert the power signals to one or more bias voltage outputs. In many embodiments, the power supply circuit 306 generates a separate bias voltage output for digital and/or electronic circuitry (e.g. processing circuit 312, communication block 310), and a separate bias voltage output for the power stage 314, which powers the motor 316. In some cases, other analog (or digital) circuitry, such as the signal conditioning circuit 322 or energy management circuit 308, may require still another separate bias voltage level. In general, however, it will be appreciated that the bulk of the output power generated by the power supply circuit 306 is used to power the motor 316 via the power stage 314.

To provide multiple output voltages, the power supply circuit 306 may suitably be a switched mode power supply having a transformer with multiple secondary coils, or at least a secondary coil with multiple taps. Alternatively, the power supply circuit 306 may suitably include one or more linear power supplies, or a combination of one or more linear power supplies and one or more switched mode power supplies.

The energy management circuit 308 is a circuit that includes at least a first capacitor 328 configured to store energy received from the power supply 306. In particular, if the motor 316 is not operating, then the power supply 306 will likely be capable of generating more output power (from the power received on the communication line 326) than is used by the circuitry of the actuator 300. In such a case, the energy management circuit 308 is configured to store the excess energy in the capacitor 328.

In at least some embodiments, the energy management circuit 308 is further configured to deliver energy to the power stage 314 or other circuits 310, 312, 322 of the actuator 300 in the event that the electrical power needs of the actuator 300 exceed the power that can be generated based solely on the power received via the communication line 326, at least on a temporary basis. For example, if the power received via the communication line 326 is thirteen watts, and the motor 316 requires twenty watts of power to operate, then the power supply circuit 306 alone cannot provide sufficient power to run the motor 316. In such a situation, the energy management circuit 308 is configured to provide the additional power requirements from the capacitor 328.

In still another embodiment, the energy management circuit 308 is capable of providing energy stored from the capacitor 328 back to the communication line 326 via the splitter 304 and the port 324. In this manner, multiple actuators coupled to the same PoE power source may share stored energy. Such operation is described in further detail below in connection with FIG. 4.

The communication circuit 310 is a circuit configured to communicate data over the communication line 326. In this embodiment, the communication circuit 310 is configured to communicate over an Ethernet network that includes the communication line 326. The communication circuit 310 is further capable of communicating internally with the processing circuit 312. In particular, the communication circuit 310 is configured to receive data from the processing circuit 312, provide whatever additional formatting, processing, filtering, amplification and/or modulation is required for transmission, and transmit communication signals including the received data over the attached communication line 326 via the splitter 304 and the port 324. Conversely, the communication circuit 310 is also configured to receive externally generated signals from the splitter 304, process the signals to extract data therefrom, and provide the data to the processing circuit 312.

The processing circuit 312 is a circuit that is capable of performing the control functions of the actuator 300. Such control functions include, at a fundamental level, providing suitable signals to move the actuator output 320 in a controlled manner. To this end, the processing circuit 312 may provide control signals to the power stage 314, which drives the motor 316, in response to a desired position value (or set point). The processing circuit 312 may suitably obtain the desired position value or set point from an external signal received via the communication circuit 310. In some cases, the received signal does not actually contain a position set point. In such cases, the processing circuit 312 can derive a desired position value based on information received from the external signal.

The processing circuit 312 preferably also controls the operation of the power stage 314/motor 316 based on feedback signals originated at the motor 316, gear train 318, output 320 and/or power stage 314. The feedback signals may indicate position, speed, strain or other information used by the processing circuit 312 to modify operation.

To this end, the processor circuit 312 may suitably include a microprocessor, microcontroller or the like. The computing burden on the processing circuit 312 is relatively limited, and will typically be significantly less than that of a general purpose computer. Given the limited computational burden, and given the limited available electrical power, it can be advantageous to select a processor for the processing circuit 312 that sacrifices some computational speed for reduced electrical power use. Suitable specialized processors would be well known to those of ordinary skill in the art.

Additional detail regarding the operation of the processing circuit 312 is provided further below. In general, many of the operations of the processing circuit 312 described herein can be carried out by suitable firmware or software programming.

As discussed above, the processing circuit 312 is configured to provide control signals to the power stage 314. To this end, the processing circuit 312 includes an output that is operably connected to a control input of the power stage 314. The power stage 314 is a power circuit that is configure to provide operational power to the motor 314 responsive to control signals received from the processing circuit 312. In a first embodiment, the power stage 314 merely turns the motor on or off based on the received control signal. In another embodiment, the power stage 314 further controls a voltage, current or frequency level to adjust the speed of the motor 316. This type of control is known as continuous modulating control. In general, the power stage 314 is selected to match the type of the motor 316, as well as the type of control that is expected from the actuator 300. Suitable power stages 314 would be known to those of ordinary skill in the art. The power stage 314 is operably coupled to obtain power for delivery to the motor from the power supply circuit 306.

The motor 316 is an electro-motive device that rotates an output 316a responsive to power signals received from the power stage 314. The motor 316 may suitably be a DC brush or brushless motor, a stepper motor, an induction motor, a synchronous motor or a reluctance motor. In some embodiments as discussed above, the motor 316 is selected (along with the power stage 314) to allow for speed control.

The gear train 318 is preferably a reduction gear set that translates or transforms the rotational output of the motor 316 to a slower speed with increased torque for driving the mechanical output 320. As a result, a motor 316 having a limited torque, high speed output can be used to drive or move the mechanical output 320 that is connected to a relatively heavy ventilation damper. For example, a motor 316 having 300 rpm can be reduced by $\frac{1}{300}$ to move a damper 90 degrees in fifteen seconds. Such a translation can allow for a motor having a torque output that is approximately $\frac{1}{300}$th of that required to move the damper 320. Suitable motor and gear train pairings are known in the art for use for HVAC actuators, dampers, valves and the like.

The signal conditioner circuit 322 is a circuit that is configured to receive feedback signals from one or more of the power stage 314, the motor 316, the gear train 318 or the mechanical output 320. The signal conditioner 322 may suitably include filters, A/D converters or other devices that generate from the feedback signal a digital feedback signal that is usable by the processing circuit 312.

The feedback signals may be generated by sensors, not shown, but would be known to those of ordinary skill in the art. For example, the power stage 314 may include sensors that generate voltage and/or current feedback signals representative of the strain on the motor 316. The motor 316 may have sensors for rotational speed feedback signals. The gear train 318 and output 320 may also include sensors that provide feedback as to speed of rotation and/or position. Various methods for controlling the movement of an actuator based on one or more of the foregoing feedback signals are known in the art.

In general operation, the actuator 300 is operably connected to the communication line 326 at the port 324. The communication line 326 includes electrical power signals that will vary from less than 1 watt to up to as many as 50 watts or more, depending on the PoE source connected to the communication line 326, how many other devices are connected to the same communication line 326, and whether other devices connected to the communication line 326 have the ability to provide temporary boost power.

The actuator 300 receives the power signals (along with communication signals, if any), from the port and splits them off at the splitter 304. The splitter 304 provides the power signals to the output 304a. The power signals at the output 304a propagate to the power supply circuit 306. The power supply circuit 306 converts the input power into the appropriate voltage levels to provide bias voltages to the communication circuit 310, the processing circuit 312, the signal conditioner 322, and the power stage 314. When the motor is activated, the power stage 314 typically is the largest consumer of power from the power supply circuit 306.

The actuator 300 also receives communication signals from time to time, for example, providing a command to change the rotational position of the mechanical output ("output position"). For example, such a command may relate to closing a ventilation damper, or opening a chilled water valve. Other commands may relate to changing a fan speed. The commands received communication signals may actually contain a set point for the output position (or speed). In other cases, the command includes information from which the processing circuit 312 may derive the set point.

The splitter 304 receives the communication signals and provides the communication signals to the output 304b. The communication signals propagate from the output 304b to the communication circuit 310. The communication circuit 310 extracts digital data representative of the transmitted command (or other communication) and provides it to the processing circuit 312. It will be appreciated that any number of the functions of the splitter 304, the communication circuit 310 and processing circuit 312 may be performed by shared components, and/or different circuits in the same chip or module. The functional distinction shown in FIG. 3 is provided for clarity of exposition only.

The processing circuit 312 then performs data processing to determine whether the received data indicates that a change in state in the mechanical output is required. If so, the processing circuit 312 provides a control signal to the power stage 314 that causes the power stage 314 to power the motor 316 in a controlled manner. The motor 316 then rotates, rotating the gear train 318, which in turn rotates the mechanical output 320. The processing circuit 312 further receives feedback information from one or more of the power stage 314, motor 316, gear train 318 and/or mechanical output 320 which it uses to ensure that the mechanical output 320 has been manipulated to achieve the desired output as indicated by the received data signal.

By way of example, if the processing circuit 312 receives a command to open a ventilation damper connected to the mechanical output 320 (corresponding to an output position of 90°, and the current output position is 45°, then the processing circuit 312 may provide a control signal to the power stage 314 to rotate the motor 320 such that the output position increases from 45° to 90°. In addition, the signal conditioner 322 receives positional feedback information from the mechanical output 320. The signal conditioner 322 provides the positional feedback to the processing circuit 312, which uses the information to determine when to provide a control signal to the power stage 314 to stop the motor 316 from rotating any further.

The processing circuit 312 in other embodiments of the actuator 300 acts in an analogous manner. Control the operation of an actuator to change the output position of the actuator is known. In some embodiments, the processing circuit 312 instead, or in addition, controls the speed of rotation of the output 320. For example, the actuator 300 may be a fan control, wherein the power stage 314 is used to control speed of the fan. Such an embodiment may even lack a gear train 318 in some cases.

As discussed above, the actuator 300 is configured to operate primarily or solely from power delivered by the communication line 326. While 13 watt and 30 watt systems have been defined by standard, at least one known 56 watt solution has been developed.

An advantage of the embodiment described above is that separate power wiring is not needed to power the actuator 300. Power is delivered to the actuator using the same cable that is already required for communications. The reduction in installation cost using this method can be significant. A feature of at least some embodiments of the present invention relates to managing power usage such that actuators can operate with the limited power available in communication lines. Described below are various methods of managing power that may be employed to enable widespread use of the communication line power actuator 300 for HVAC applications.

System Configuration for Basic Communication Line Powered Actuator

In a first implementation, a single actuator 300 can be designed to work specifically using power available in the PoE framework. In general, such a solution involves ensuring that the power used by the actuator 300 does not exceed the available power on the power line. To this end, it can be determined that amount of force that is need to operate the mechanical output with a load (e.g. a damper) attached thereto. For example, the power measurement of rotating the mechanical output 320 is given by the equation:

$$\rho = \tau \theta_s$$

wherein $\rho$ is mechanical power, $\tau$ is torque, and $\theta_s$ is angular speed.

In this case, the mechanical power $\rho$ is limited to below that of the available electrical power. Thus, if 13 watts is available, then the mechanical power $\rho$ is limited to the power defined by 13 watts, less conversion losses and power requirements of the other circuitry. Thus, the mechanical power p of the actuator 300 typically needs to be less than approximately 60% to 80% of the available power on the communication line 326.

In most cases, the torque $\tau$ component is defined by the damper to which the actuator is connected, and therefore cannot be adjusted to accommodate the limited available power. Accordingly, the configuration of the actuator 300 can involve adjusting the speed of rotation, either by changing gear ratios, or operating the motor differently, such that the angular speed $\theta_s$ is sufficiently low to allow the mechanical power $\rho$ to be within the limits defined by the available electrical power from the communication line 326, the requirements of the other circuits in the actuator 300, and the conversion losses.

Because this particular implementation is designed to work within the confines of the available instantaneous power available via the communication lines, this design is well-suited for actuators connected to dampers and valves that are subject to frequent manipulation. These can include dampers and valves that control airflow rate, as well as temperature, to the "point of use", such as rooms or spaces within the building occupied by people.

Communication Line Power with Storage Assist

In many cases, however, an actuator 300 is not typically expected to operate on a constant basis, but rather periodically. For example, a damper used in an air handling unit of an HVAC system can in some examples be expected to operate twice every twenty-four hours. For such implementations, it can be possible to operate an actuator with power requirements that significantly exceed the available instantaneous power on the communication line.

To this end, in cases of known periodic operation, the actuator 300 may employ energy storage to provide a power "burst" for the operation of the actuator 300. In particular, during times when the actuator 300 is not in use, the power received from the communication line 326 can be used to charge the capacitor 328. When the actuator 300 operates, power can be tapped off of the capacitor 328.

To carry out such operation, the power supply circuit 306 stores excess received power into the capacitor 328 of the energy management circuit 308 whenever excess power is available from the communication line 326. For example, if the power consumption of the elements of the actuator 300 do not exceed the power that is available (or allocated) to the actuator 300, then the excess power is stored in the capacitor 328. When the actuator 300 is to operate, the energy management circuit 308 ensures that the capacitor 328 can discharge to the power input of the power stage 314. In the example shown in FIG. 3, the capacitor 328 provides power through the power supply circuit 306 to the power stage 314. In other embodiments, the capacitor 328 is connected to the power stage 314 directly, or at least without passing through the power supply circuit 306.

Various methods of storing energy in a capacitor over periods of time, and then making the energy available for "bursty" use, are well known.

With this embodiment, the speed of the actuator 300 does not necessarily need to be manipulated to enable use of power from the communication line 326. Instead of relying on instantaneous power available, the actuator 300 is designed such that the capacitor 328 stores the energy sufficient for the maximum expected periodic movement of the actuator. For example, suppose that an actuator 300 is expected to move twice a day, with periods of no less than 10 hours between movement, and with no more than 90 degrees of movement. In this case, the actuator 300 is designed such that the capacitor 328 can store much, if not all, of the energy required to perform the maximum possible movement twice per day.

To this end, it will be appreciated that the maximum required mechanical energy may be measured as torque multiplied by maximum angular displacement or $$E_M = \rho \theta_t,$$

wherein $E_M$ is the maximum energy requirement, $\tau$ is the torque associated with rotating the damper or valve attached to the output 320, and $\theta_t$ is the maximum possible displacement in degrees, for example, 90 degrees. The energy storage requirement of the capacitor 328 is typically chosen to equal or slightly exceed the value $E_M$.

It is also necessary to ensure that sufficient time is available for the capacitor 328 to recharge between operations of the actuator 328. For example, if the total energy required to move a large damper connected to an actuator 300 ninety degrees is equivalent to approximately 50 watt-hours, and the available energy on the communication line is 13 watts, then the actuator 300 should not be expected to operate more often than once every four hours, in the worst case. Otherwise, alternative backup energy must be made available.

If the actuator 300 is moved relatively frequently, but still periodically enough to justify the use of stored energy, then the actuator 300 employs both stored energy from the capacitor 328 and power from the communication line 326. In such a case, the available energy for the actuator movement 300 is equal to the energy stored in the capacitor as well as (approximately) the available communication line power multiplied by the travel time of the actuator 300 during the movement. Suitable methods for obtaining energy from the capacitor 328 and the communication line 326 would be known to those of ordinary skill in the art.

It will be appreciated that while a single capacitor 328 is shown in FIG. 3, the above described embodiment may alternatively employ multiple capacitors, and/or other other energy storage devices.

Communication Line Power Sharing

Figure 4:
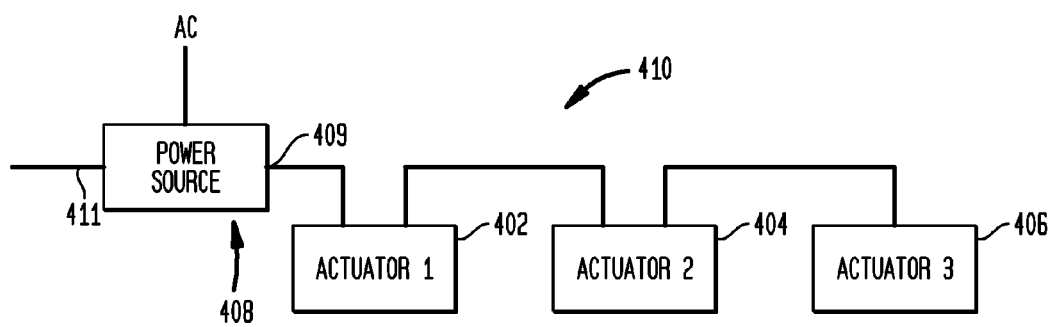
FIG. 4 shows a schematic block diagram of an arrangement for communicating with and providing power to a plurality of actuators according to an embodiment of the invention.

In another embodiment, multiple actuators 402, 404 and 406 may be connected to the same power source 408. For example, FIG. 4 shows a block diagram of first, second and third actuators 402, 404, and 406 connected to a single communication line power source 408 via Ethernet-standard cables 410. Such a configuration 400 can be typical because Ethernet backbone (switch/router) outputs typically connect to a plurality of devices.

In the embodiment of FIG. 4, the power source 408 is a communication device that includes a cable port or jack 409 through which network data may be communicated, and through which electrical power may be delivered. For example, the power source 408 may suitably an Ethernet switch, router or miwith PoE powered outputs, here illustrated as a single exemplary output jack or port 409. The cable port 409 may have a standard 8-pin output, and provide communications and power in the manner described by the IEEE 802.3af or IEEE 802.3at standard, for example. The power source 408 also includes other ports 411 as known in the art to facilitate communication with other devices, not shown.

In this embodiment, the cables 410 are eight conductor cables, and are daisy-chain connected from one actuator to the next. To this end, each actuator 402, 404 (and 406) may have the design of the actuator 300 of FIG. 3, modified to include an additional port directly connected to the port 324. The purpose of the daisy-chain style connection is to provide convenient physical connectors for cable interconnection. This design of the actuator 324 allows for interconnection of any number of actuators via separate lengths of standard Ethernet compatable cable.

In general, a conservative design of the system 400 is to ensure that the power requirements of all three actuators 402, 404 and 406 during usage does not exceed the available instantaneous power from the power source 408. This approach is similar to that of the first implementation, discussed further above, but applied to three actuators instead of one. For example, if the power available form the source 408 is 30 watts, then the combined power requirements of the three actuators should not exceed 30 watts.

In fact, a design configuration would be to connect a maximum number of actuators to the output 409 of the source 408, wherein the additive cumulative power requirements do not exceed the available power from the source 408 via the Ethernet cables 410.

However, it is also possible to use internal control of the actuators 402, 404 and 406 and/or communication among the actuators 402, 404 and 406 to efficiently allocate power among those devices. For example, if it is not necessary to operate all of the actuators 402, 404, and 406 at the same time, then such allocation allows for the total power requirements of the actuators 402, 404 and 406 to exceed the total available power from the power source 408. In some cases, the operation of a particular actuator may be delayed, or even carried out at a slower speed, if sufficient power is momentarily unavailable. To this end, it is noted that control strategies do not always require instant actuation. Moreover, it is possible that multiple actuators 402, 404 and 406 may have different priorities, such that if a high priority actuator requires power that is presently unavailable, a lower priority actuator may be stopped or slowed to make power available. In yet another configuration, one or more of the actuators 402, 404 and 406 includes an energy storage device, such as the capacitor 328, and is configured to deliver excess energy back to the cables 410 via the port 324 in the event that such power is needed.

Such coordination of operation among the actuators 402, 404 and 406 may readily be carried out via communications over the cables 410.

Figure 5:
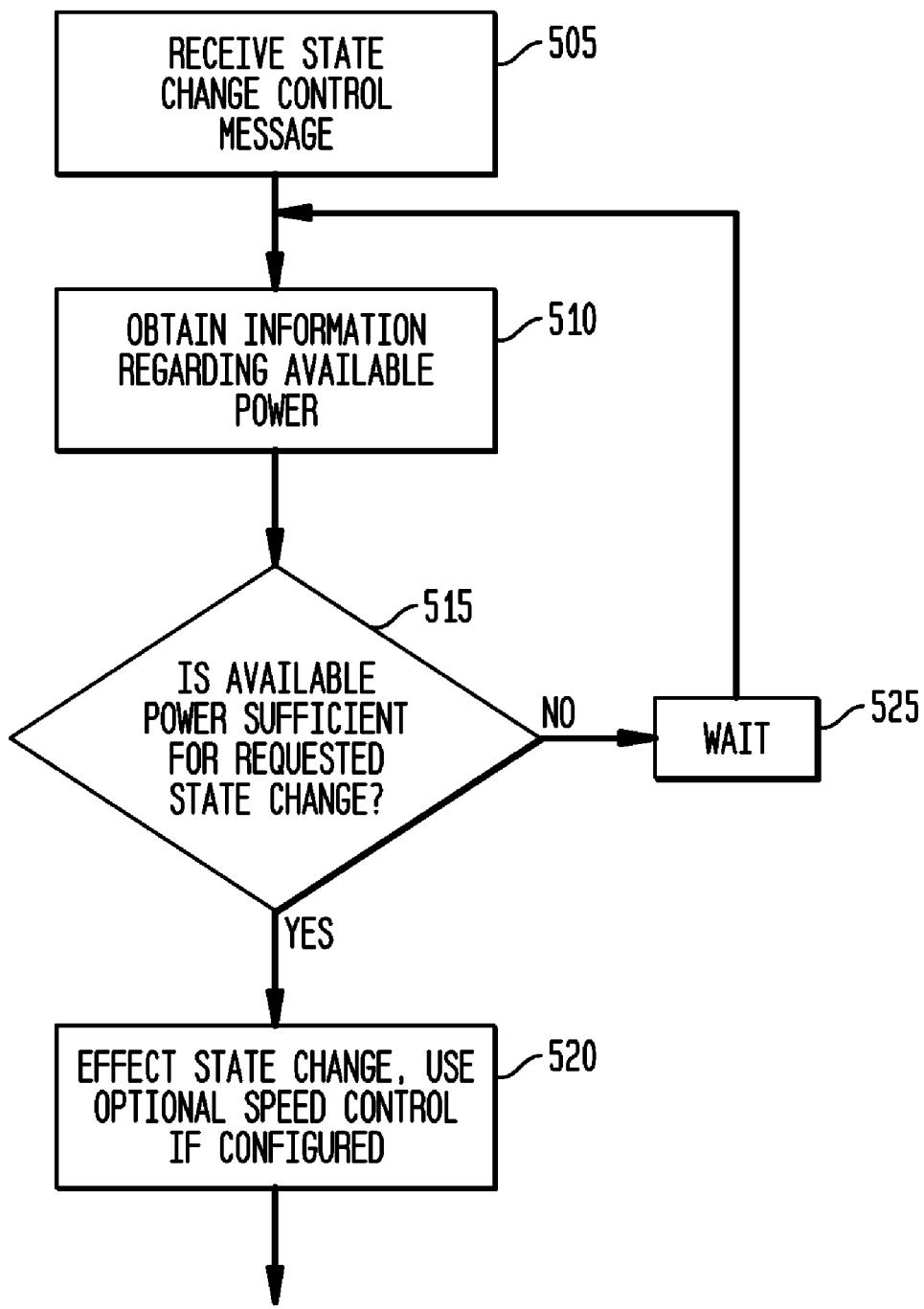
FIG. 5 shows a flow diagram of a set of operations that may be performed by a processing circuit in an actuator of FIG. 4.

FIG. 5 shows an exemplary flow diagram of operations that may be carried out by the processor circuit of each of the actuators 402, 404, 406 of FIG. 4 to coordinate power usage such that the combined maximum power requirements of the actuators 402, 404 and 406 (moving at nominal speed) may exceed the available power from the power source 408. The operations of FIG. 5 relate specifically to a situation in which the actuator 402 is to be operated. It may be assumed that the actuator 402 has the general configuration of the actuator 300 of FIG. 3. Accordingly, the reference numbers of FIG. 3 will be used to describe like components of the actuator 402 herebelow.

In step 505, the processing circuit 312 (of actuator 402) receives a communication message (via communication circuit 310) indicating that the output position of the actuator 402 is to be changed, thereby requiring power to be delivered to the motor 316 of the actuator 402.

In step 510, the processing circuit 312 obtains information regarding the power available on the communication line 326/410. To this end, the processing circuit 312 generates a communication message that is transmitted by the communication circuit 310, via the splitter 304 and port 324, to the processing circuits of the other actuators 404, 406. The communication message requests a response identifying the amount of power that is currently being used by the actuators 404, 406. The message may also request whether the actuators 404, 406 have reserve energy available from storage capacitors. The actuators 404, 406 subsequently provide their response, which is then received by the processing circuit 312 (of the actuator 402) via its communication circuit 310. In this manner, the processing circuit 312 determines the amount of power that is currently in use by the other actuators 404, 406, and can therefore determine the amount of remaining power available in the communication line 326/410.

It will be appreciated that instead of transmitting a specific query to each actuator 404, 406, the actuators 402, 404 and 406 may regularly broadcast their current power consumption to other devices connected to the output 409. In such a case, the processing circuit 312 would determine the available electrical power from the latest updates of each device on the arrangement 400.

In any event, at the conclusion of step 510, the processing circuit 312 determines the amount of electrical power that is available on the communication line 410.

In step 515, the processing circuit 312 determines whether sufficient power is available to perform the operation requested in the message received in step 505. Step 515 therefore involve determining whether the power required to execute the operation in the actuator 402 exceeds the calculated available power. In some cases, the calculation may also take into account any power available from the capacitor 328 of the actuator 402.

If the processing circuit 312 determines that sufficient power is available to perform the requested operation, then the processing circuit 312 proceeds to step 520 to provide appropriate control signals to the power stage 314 to effectuate the operation.

In a case wherein the speed of the motor 316 is adjustable, the processing circuit 312 provides control signals that cause the motor 316 to operate at one of a plurality of speeds, the speed selected in part based on the available power determined in step 510. For example, if no other actuator 404, 406 is currently using power, then the processing circuit 312 can cause the mechanical output 320 (via motor speed) at one its higher speed levels. By contrast, if the other actuators 404, 406 are both using significant power, and only a little is available, then the processing circuit 312 can cause the mechanical output 320 to operate at a slower speed, requiring less power. This can allow the motor 316 to run at a slower speed when there is not sufficient power to run at a normal or nominal speed.

Referring again to step 515, if it is instead determined that insufficient power is available to effectuate the state change of the mechanical output 320, then the processing circuit 312 postpones the state change operation in step 525, and causes power to not be delivered to the motor 316. After a short delay in step 525, the processing circuit 312 returns to step 510 to obtain an update on the available power and proceeds accordingly.

These various methods allow for communication line powered actuators in a number of applications in an HVAC system.

It will be appreciated that the above described embodiments are merely illustrative, and that those of ordinary skill in the art may readily devise their own implementations and modifications that incorporate the principles of the present invention and fall within the spirit and scope thereof.

I claim:

1. An actuator comprising:
   a) at least one drive arrangement configured to generate output mechanical power from input electrical power;
   b) a communication line input port configured to connect to a communication line, the communication line input port configured to obtain electrical power from the communication line;
   c) a control unit configured to obtain first information from the communication line via the communication line input port, the control unit further configured to adjust the operation of the at least one drive arrangement based on the first information and based upon information identifying electrical power available for use as input electrical power,
   wherein the control unit is configured to adjust the operation of the at least one drive arrangement by temporarily inhibiting operation of the drive arrangement if it is determined that insufficient electrical power is available for use as input electrical power.

2. The actuator of claim 1, wherein the control unit is configured to obtain the information identifying electrical power available for use as input electrical power at least in part from a data message received via the communication line input port.

3. The actuator of claim 2, wherein the control unit is configured to obtain a subsequent data message, and to cause operation of the at least one drive arrangement based on the first information and the subsequent data message.

4. The actuator of claim 1, wherein the control unit is configured to obtain the information identifying electrical power available for use as input electrical power at least in part from a data message received via the communication line input port.

5. The actuator of claim 1, wherein the first information includes information indicative of a set point output position of the actuator.

6. The actuator of claim 1, wherein the at least one drive arrangement includes a motor and one or more gears.

7. The actuator of claim 1, further comprising an energy storage device configured to provide boost power to the at least one drive arrangement.

8. The actuator of claim 1, wherein the communication line input port comprises an Ethernet cable jack.

9. A method comprising:
a) connecting a communication line input port of an actuator to a communication line, the actuator further including at least one drive arrangement configured to generate output mechanical power from input electrical power, and a control unit configured to obtain first information from the communication line via the communication line input port, the control unit further configured to adjust the operation of the at least one drive arrangement based on the first information;
b) obtaining electrical power from the communication line input port and generating the input electrical power from the obtained electrical power; and
further comprising storing at least some of the obtained electrical power in an energy storage device; and using the stored power to generate the input electrical power, wherein the input electrical power exceeds the obtained electrical power.

10. The method of claim 9, further comprising adjusting an actuator speed based information identifying electrical power available from the communication line.

* * * * *